Oct. 7, 1924.
S. TRACHTENBERG
COMB
Filed May 19, 1924
1,510,512
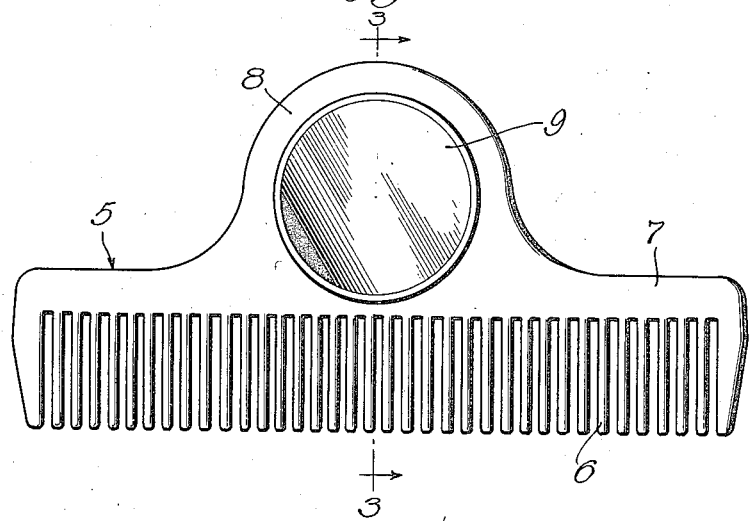
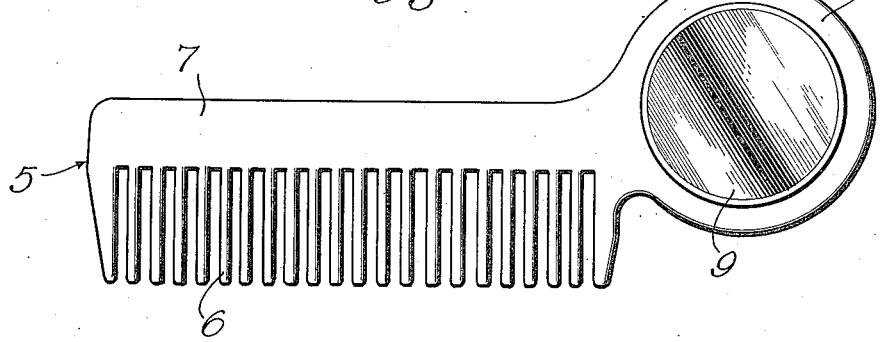
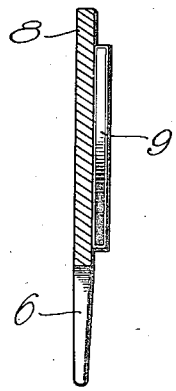
Inventor
Samuel Trachtenberg
By John A. Bommhardt
Attorney Patented Oct. 7, 1924.

1,510,512

UNITED STATES PATENT OFFICE.

SAMUEL TRACHTENBERG, OF CLEVELAND, OHIO.

COMB.

Application filed May 19, 1924. Serial No. 714,341.

*To all whom it may concern:*

Be it known that I, SAMUEL TRACHTENBERG, a citizen of the United States, residing at Cleveland, in the county of Cuyahoga and State of Ohio, have invented certain new and useful Improvements in Combs, of which the following is a specification.

This invention relates to improvements in combs and has for its primary object the provision of a combined comb and mirror.

It is likewise an object to provide a comb preferably of the small or pocket comb type and include in its structure an integral extension adapted to mount a mirror or the like.

Other objects will be in part obvious and in part pointed out hereinafter.

In order that the comb and mirror construction and advantages may be readily understood by others, I have in the accompanying drawings and following description based thereon set out several embodiments thereof.

In these drawings:

Figure 1 is a side elevation of a comb including a mirror carrying extension intermediate its ends;

Figure 2 is a similar view showing a mirror carrying extension at one end, and

Figure 3 is a central vertical sectional view taken substantially on the line 3—3 of Figure 1.

Having more particular reference to the drawings throughout which similar characters of reference designate like parts, this improved comb may be stated as comprising a comb 5 including the usual teeth 6 and back portion 7 all integrally formed.

Arranged upon the back as shown in Figures 1 and 3 is an integral extension 8 which quite obviously may be of any preferred configuration and is designed to mount a mirror or the like 9. Numerous efficient and satisfactory means may be employed to retain a mirror upon the extension and for the purpose of this application I have simply glued the mirror back or frame to the extension. This construction provides an unique and desirable comb which may be conveniently carried and occupies very little more space than an ordinary comb.

In Figure 2, I show another arrangement of the comb extension, the method of attaching a mirror thereto being similar to that employed in the first form or in any other preferred manner.

I claim:

A comb including an extension arranged in a plane with its back and stamped integral therewith, and a mirror arranged upon one face of extension.

In testimony whereof, I affix my signature.

SAMUEL TRACHTENBERG.